US008683731B2

(12) United States Patent
Kowalczyk et al.

(10) Patent No.: US 8,683,731 B2
(45) Date of Patent: Apr. 1, 2014

(54) FIREARM LASER SIGHT ALIGNMENT ASSEMBLY (75) Inventors: John Kowalczyk, Pittsford, NY (US); Jeffrey Tuller, Rochester, NY (US); Jeffrey Mock, Rochester, NY (US)

(73) Assignee: Lasermax, Inc., Rochester, NY (US)

( * ) Notice: Subject to any disclaimer, the term of this patent is extended or adjusted under 35 U.S.C. 154(b) by 89 days.

(21) Appl. No.: 13/245,309

(22) Filed: Sep. 26, 2011

(65) Prior Publication Data

US 2013/0074351 A1 Mar. 28, 2013

(51) Int. Cl.
*F41G 1/00* (2006.01)

(52) U.S. Cl.
USPC ................................. 42/111; 42/114; 89/41.19

(58) Field of Classification Search
USPC .................... 42/111, 113, 114, 117, 143, 148; 89/41.19
See application file for complete search history.

(56) References Cited

U.S. PATENT DOCUMENTS

| 5,056,254 | A | * | 10/1991 | Bechtel | 42/114 |
| 5,179,235 | A | * | 1/1993 | Toole | 42/115 |
| 5,253,443 | A | | 10/1993 | Baikrich | |
| 5,282,594 | A | * | 2/1994 | Huang | 248/205.1 |
| 5,375,362 | A | * | 12/1994 | McGarry et al. | 42/117 |
| 5,485,695 | A | * | 1/1996 | Glock | 42/117 |
| 5,531,040 | A | * | 7/1996 | Moore | 42/115 |
| 5,581,898 | A | | 12/1996 | Thummel | |
| 5,590,486 | A | * | 1/1997 | Moore | 42/114 |
| 5,621,999 | A | * | 4/1997 | Moore | 42/117 |
| 5,706,600 | A | * | 1/1998 | Toole et al. | 42/115 |
| 5,758,448 | A | * | 6/1998 | Thummel | 42/114 |
| 5,784,823 | A | | 7/1998 | Chen | |
| 6,230,431 | B1 | * | 5/2001 | Bear | 42/117 |
| 6,393,752 | B1 | * | 5/2002 | Oliver et al. | 42/114 |
| 7,117,627 | B2 | * | 10/2006 | Woodmansee et al. | 42/146 |
| 7,275,344 | B2 | * | 10/2007 | Woodmansee et al. | 42/146 |
| 7,331,137 | B2 | | 2/2008 | Hsu | |
| 7,395,627 | B2 | * | 7/2008 | La France et al. | 42/114 |
| 7,472,830 | B2 | | 1/2009 | Danielson | |
| D603,478 | S | | 11/2009 | Hughes | |
| 7,726,061 | B1 | * | 6/2010 | Thummel | 42/115 |
| D636,049 | S | | 4/2011 | Hughes et al. | |
| D636,837 | S | | 4/2011 | Hughes et al. | |
| 7,926,218 | B2 | | 4/2011 | Matthews et al. | |
| 8,109,024 | B2 | * | 2/2012 | Abst | 42/69.01 |
| 8,117,782 | B2 | * | 2/2012 | Gross et al. | 42/146 |
| 8,256,154 | B2 | * | 9/2012 | Danielson et al. | 42/146 |
| 2002/0100202 | A1 | * | 8/2002 | Lin et al. | 42/114 |
| 2004/0128900 | A1 | * | 7/2004 | Chen et al. | 42/85 |
| 2005/0257415 | A1 | * | 11/2005 | Solinsky et al. | 42/146 |
| 2007/0113462 | A1 | * | 5/2007 | Ho | 42/146 |
| 2007/0193103 | A1 | * | 8/2007 | Cheng | 42/111 |
| 2009/0307955 | A1 | * | 12/2009 | NuDyke | 42/117 |

(Continued)

*Primary Examiner* — Benjamin P Lee
(74) *Attorney, Agent, or Firm* — Lee & Hayes, PLLC (57) ABSTRACT

A firearm laser sight alignment assembly includes a laser module for emitting a beam along an optical axis, the laser module having an outer seat. The alignment assembly encompasses a resilient grommet mechanically engaging the outer seat in a first adhesive free interference fit. The grommet includes an external seat sized to form adhesive free interferences fits with a laser cover and the housing, as the laser cover engages the housing to retain the grommet with respect to the housing and the laser cover. Upon operable assembly, the interference fits substantially preclude axial and longitudinal movement between the grommet and the laser module as well as the grommet and the laser cover and housing, while allowing angular movement of the laser module to a desired alignment position.

29 Claims, 10 Drawing Sheets

(56) References Cited

U.S. PATENT DOCUMENTS

| | | | |
|---|---|---|---|
| 2010/0064568 A1* | 3/2010 | NuDyke | 42/117 |
| 2010/0154279 A1* | 6/2010 | Polyzos et al. | 42/117 |
| 2010/0162610 A1* | 7/2010 | Moore et al. | 42/115 |
| 2011/0035984 A1* | 2/2011 | Liu | 42/111 |
| 2011/0047851 A1* | 3/2011 | Mock et al. | 42/72 |
| 2011/0061283 A1* | 3/2011 | Cavallo et al. | 42/72 |
| 2011/0107648 A1* | 5/2011 | Tuz | 42/117 |
| 2011/0167707 A1* | 7/2011 | Gross et al. | 42/114 |
| 2011/0232151 A1* | 9/2011 | Zukowski | 42/114 |
| 2012/0047787 A1* | 3/2012 | Curry | 42/115 |
| 2012/0085015 A1* | 4/2012 | Wei | 42/117 |
| 2012/0144718 A1* | 6/2012 | Danielson et al. | 42/117 |
| 2012/0198748 A1* | 8/2012 | Ospino Orozco | 42/115 |

\* cited by examiner

FIREARM LASER SIGHT ALIGNMENT ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present disclosure generally relates to sights for firearms and particularly to laser sights for firearms, and more particularly to a firearm laser sight alignment assembly.

2. Description of Related Art

Laser sighting devices for firearms have been used for a number of years. Laser sighting devices use a laser to assist in sighting the firearm. However, as the laser beam will follow an effectively straight line, and the bullet will follow a ballistic trajectory so that, despite a high muzzle velocity, at long distances the trajectory of the bullet will deviate significantly from the straight line. Also, the laser sight must be mounted to the firearm, which means that the laser beam cannot propagate concentric with the barrel. Consequently, it is necessary to aim the laser sight so that, for a given distance, the beam will illuminate the target with a spot at the position where the bullet will be after traveling that distance. The vertical setting of the laser beam is known as "elevation" and the lateral adjustment of the beam is known as "windage."

Prior patents have been directed to the adjustment of a laser sight. U.S. Pat. No. 5,784,823 to Chen discloses a laser centrally mounted in a semi-spherical fixture which is disposed in a casing. The laser is positioned in the casing by rotation of the fixture therein, and held at the desired angle by frictional force. U.S. Pat. No. 5,581,898 to Thummel discloses a laser module disposed within a housing adapted to be mounted on a firearm, wherein the back of the laser module is seated in the back of the housing and orthogonal set screws are positioned to move the front of the module to set the elevation and windage. U.S. Pat. No. 5,253,443 to Baikrich discloses a laser sighting device having a laser module disposed in a housing and seated against the back of the housing, wherein the front of the module is moved laterally by longitudinally moving cam members having threads which engage axially rotatable rings disposed around the housing.

However, these prior devices require a significant number of components. The large number of components adds complexity in manufacturing and inventory. In addition, the large number of parts, each having an associated tolerance, creates alignment issues with respect to both manufacture and use of the product.

Therefore, the need exists for an alignment system for a firearm laser sight, wherein the number of components is reduced, thereby providing more efficient manufacture. The need further exists for an alignment system that can accommodate manufacturing tolerances of the components to provide a ready and reproducible alignment.

BRIEF SUMMARY OF THE INVENTION

The present disclosure provides a firearm laser sight assembly having a housing engaging a portion of the firearm and a laser module for emitting a beam along an optical axis, the laser module has an outside surface, wherein the outside surface includes an outer seat. The assembly further includes a resilient grommet mechanically engaging the outer seat in a first adhesive free interference fit, wherein the grommet includes an external seat. A laser cover engages the housing to retain the grommet with respect to the housing and the laser cover, wherein each of the laser cover and the housing form a second adhesive free interference fit with the external seat of the grommet to substantially preclude axial and longitudinal movement between the grommet and the laser module.

In one configuration, the laser cover and the housing dispose the laser module in a predetermined non aligned orientation relative to the firearm or the housing. The housing can include a first bore having a first longitudinal axis intersecting the laser module, wherein the first bore includes a non-threaded portion and a first threaded alignment pin.

In forming the interference fits, the outer seat of the laser module can include at least two contact faces to form the corresponding interference fits with corresponding facets on an internal seat of the grommet.

In a further construction, a laser sight assembly includes a laser module for emitting a beam along an optical axis; a housing retaining the laser module; a resilient coupling engaging a portion of the laser module in an adhesive free first interference fit to retain laser with respect to coupling; and a laser cover engaging the housing to retain the resilient coupling with respect to the housing and the laser cover, wherein a second adhesive free interference fit is formed between the resilient coupling and at least one of the laser cover and the housing.

The coupling can be configured as a grommet, wherein the coupling includes an external seat and the laser cover includes a socket sized to form a portion of the second interference fit with the coupling.

A method is provided for forming a laser sight assembly for a firearm, by disposing a resilient coupling about a laser module to form a first adhesive free interference between the coupling and the laser module; and engaging a laser cover with a housing to locate a portion of the laser module and the coupling intermediate the laser cover and the housing and form a second adhesive free interference fit between the coupling and at least one of the laser cover and the housing.

In one method, engaging the laser cover with the housing disposes the laser module in a non aligned orientation with respect to a nominal alignment position. It is contemplated the non aligned orientation is predetermined.

The method can further provide that the first interference fit and the second interference fit operably preclude longitudinal and axial movement of the laser module relative to the resilient coupling and housing. Also, the first interference fit and the second interference fit operably can permit angular movement of the laser module relative to the resilient coupling and the housing.

A spring can contact the laser module to urge the laser module to a non aligned orientation with respect to a nominal alignment position.

The present assembly can be used with a firearm having a frame, a barrel portion and a trigger guard, wherein the assembly includes a housing for engaging a portion of the trigger guard, the housing having a laser module retaining portion forward of the trigger guard and below the barrel portion; a laser module in the laser module retaining portion of the housing, the laser module for emitting a beam along an optical axis; and a switch moveable relative to the housing between an actuating position and an off position, the switch being disposed in the laser module retaining portion of the housing and having a width.

In one construction, the switch is sized to be accessible from opposing sides of the housing. Thus, the switch can be sized to be accessible from a left and a right side of the firearm. It is also contemplated at least one of, and in certain constructions each of, the frame, the barrel portion and the trigger guard is free of a mounting rail. Alternatively, the housing can be free of a mounting rail, such as a Weaver or Picatinny rail. In a further configuration, the switch can be located forward of the trigger and below the barrel, without requiring the housing to engage a mounting rail.

BRIEF DESCRIPTION OF THE SEVERAL VIEWS OF THE DRAWING(S)

FIG. 29 is a cross section view taken along line 29-29 of FIG. 26.

DETAILED DESCRIPTION OF THE INVENTION

Figure 1:
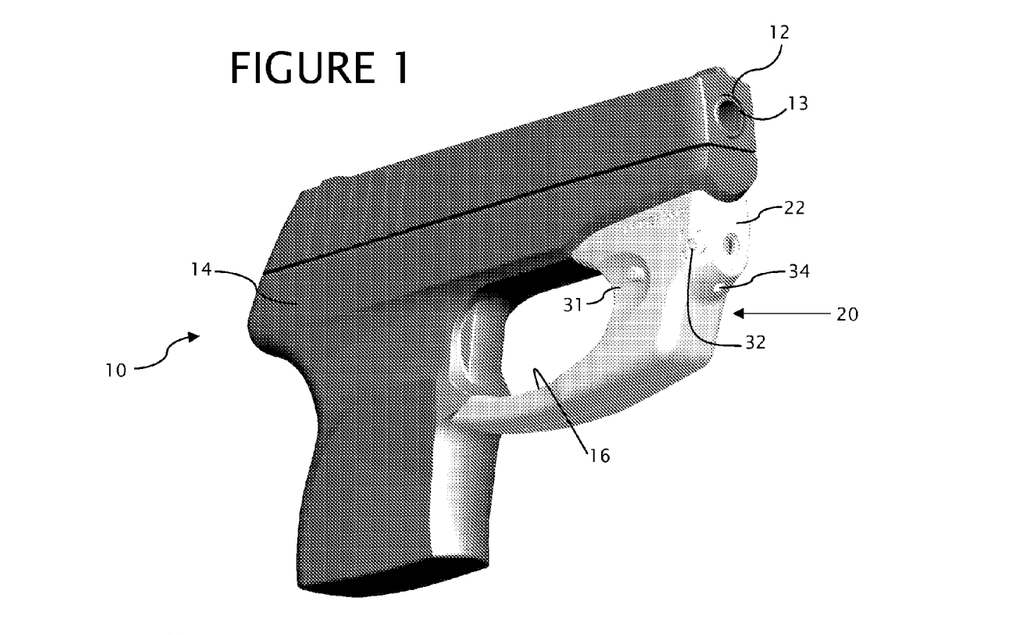
FIG. 1 is a perspective view of a laser sight having an alignment assembly, wherein the laser sight is connected to a firearm.

Referring to FIG. 1, the present firearm laser sight alignment assembly 20 is embodied in a laser sight 22 shown operably engaged with a firearm 10.

Although the firearm 10 is shown as a hand gun, it is understood the alignment assembly 20 is not limited to use with handguns, but can be employed with any pistol, gun, or rifle that selectively launches a projectile, whether by compressed gas, combustion or electromagnetic actuation. Further, although the assembly 20 is shown in conjunction with a firearm that does not have any mounting rail, it is understood the assembly can be employed with laser sight 22 that engages a mounting rail. The assembly 20 is not limited by the particular laser sight or mechanism for engaging the firearm 10.

The firearm 10 includes in relevant part a barrel 12, a frame 14, and a trigger guard 16. Although the alignment assembly 20 is shown as engaging the trigger guard 16 of the firearm 10, it is understood the alignment assembly can be cooperatively engaged with any portion of the firearm.

For purposes of description, the term "longitudinal" means the dimensions along the direction of the barrel 12. The term "width" means the dimension along a direction transverse to the axis of the barrel 12. The term "axial" means in a direction transverse to the axis of the barrel 12. The term "forward" means nearer to or towards a muzzle 13. The term "rearward" means further from or away from the muzzle 13. The term "below" means lower than, in the intended operating orientation of the firearm 10. The term "above" means higher than, in the intended operating orientation of the firearm 10. The term "preclude movement" means to prevent movement which would otherwise prevent functioning in an intended manner. The term "angular" means rotating about at least one of the longitudinal and axial directions.

The alignment assembly 20 includes a housing 30, a laser module 60, a resilient coupling 90 and a laser cover 120.

The housing 30 retains the laser module 60, the coupling 90 and the laser cover 120. In one configuration, the housing 30 is formed of mating halves (30a, 30b). However, it is understood the housing 30 can be formed as a single integral component or from a multitude of interconnected components. It has been found satisfactory to injection mold the housing 30 out of an elastomer such as a glass-filled nylon and particularly a nylon 6.6 compound reinforced with 33% glass fiber; suitable for processing by injection molding, wherein the material is lubricated for ease of mold release.

Figure 3A:
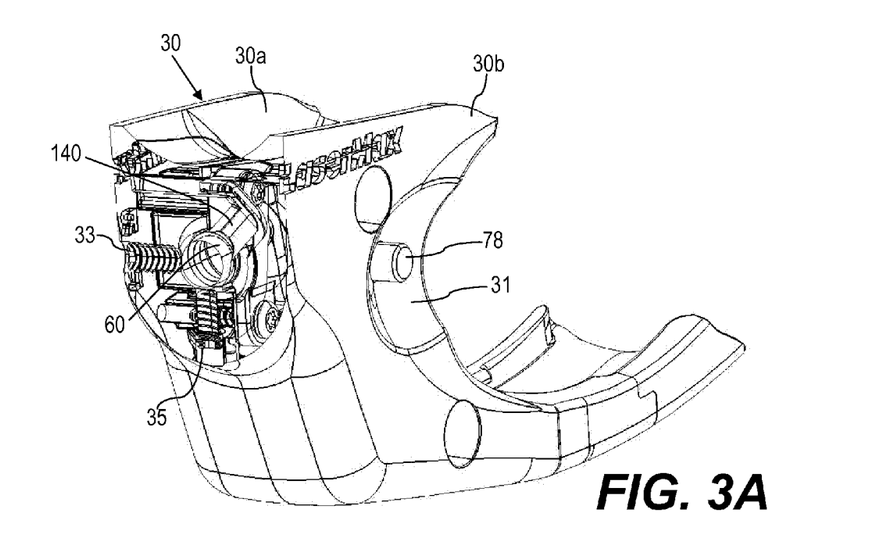
FIG. 3A is a perspective view of the alignment assembly of FIG. 2, taken along line 3A-3A.
Figure 3B:
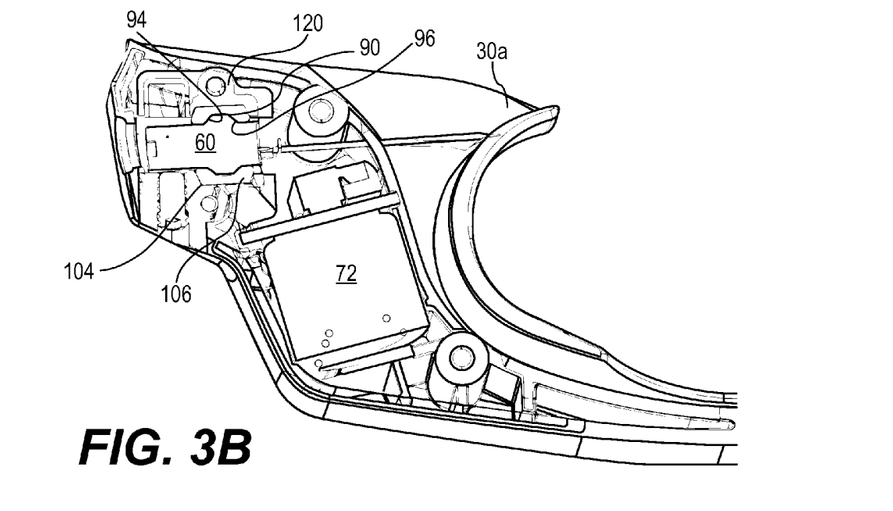
FIG. 3B is a perspective view of the alignment assembly of FIG. 2, taken along line 3B-3B.
Figure 3C:
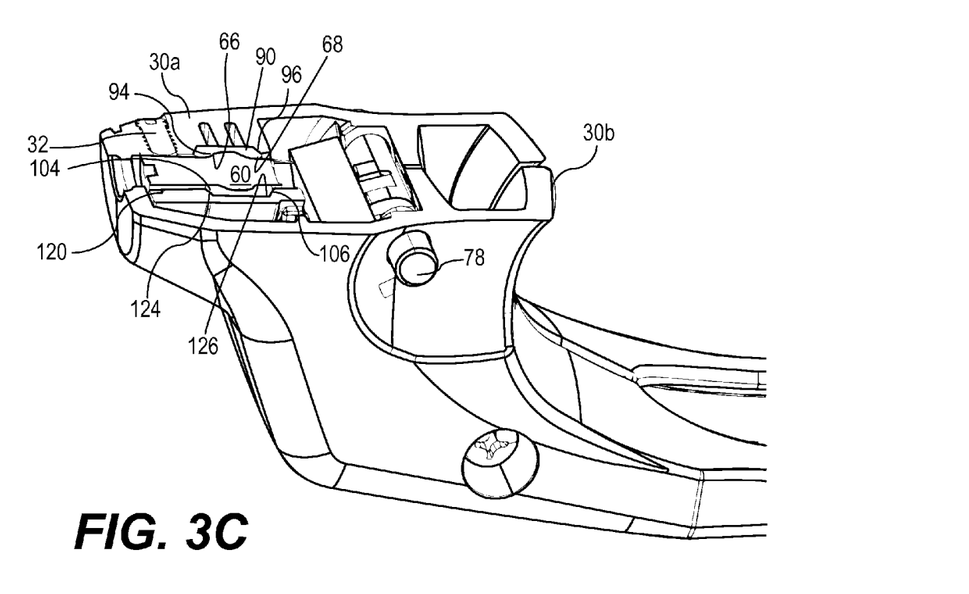
FIG. 3C is a perspective view of the alignment assembly of FIG. 2, taken along line 3C-3C.
Figure 4:
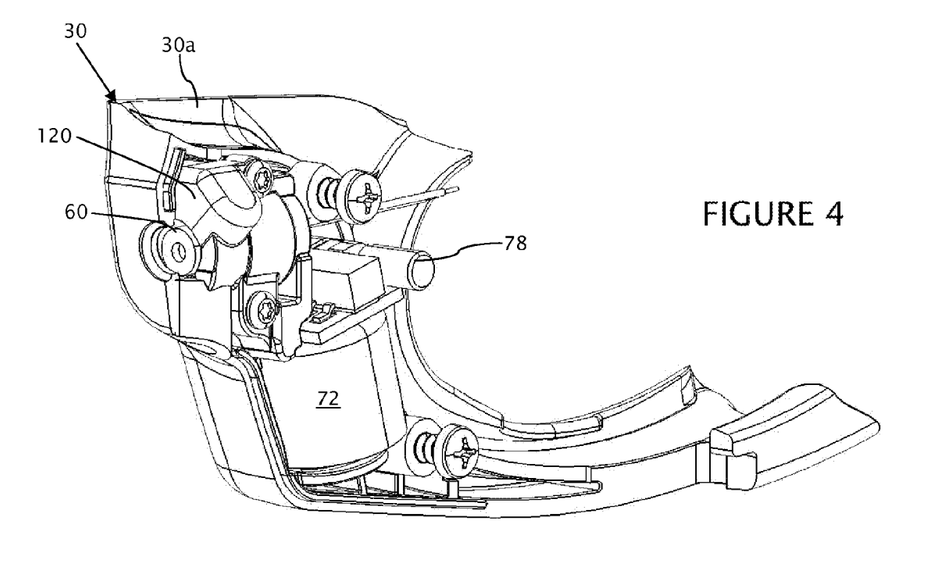
FIG. 4 is a perspective view of the alignment assembly with a portion of the housing removed.
Figure 5:
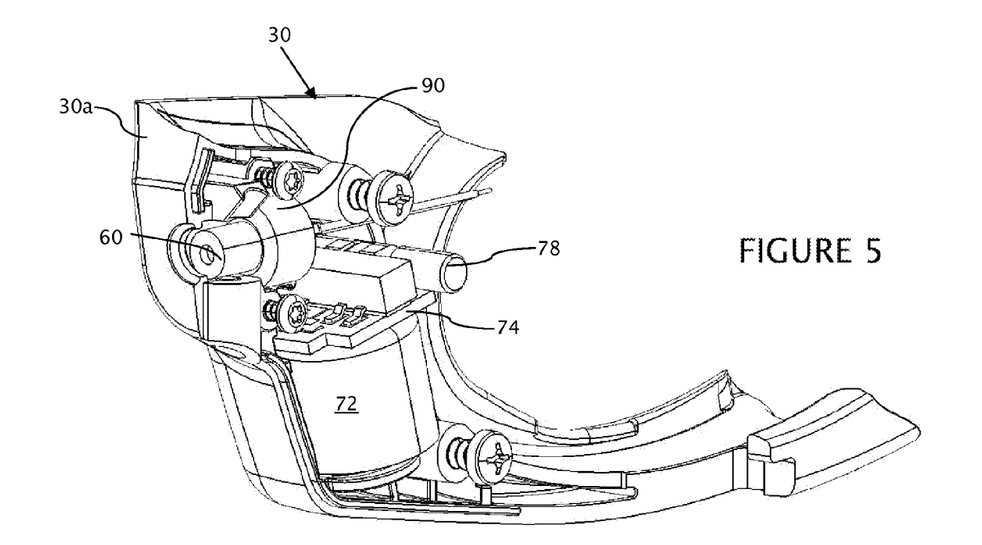
FIG. 5 is a perspective view of the alignment assembly of FIG. 2, having the laser cover removed.
Figure 6:
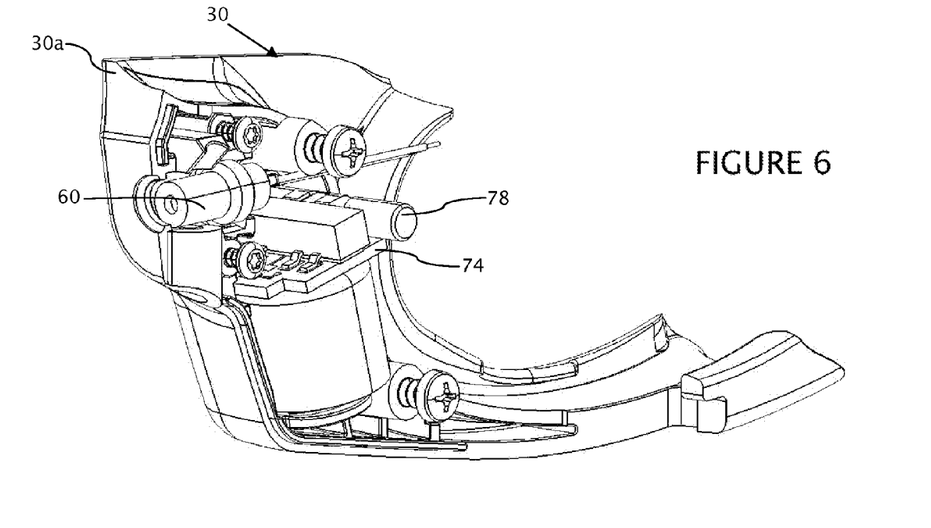
FIG. 6 is a perspective view of the alignment assembly of FIG. 2, having the laser cover and the coupling removed.
Figure 7:
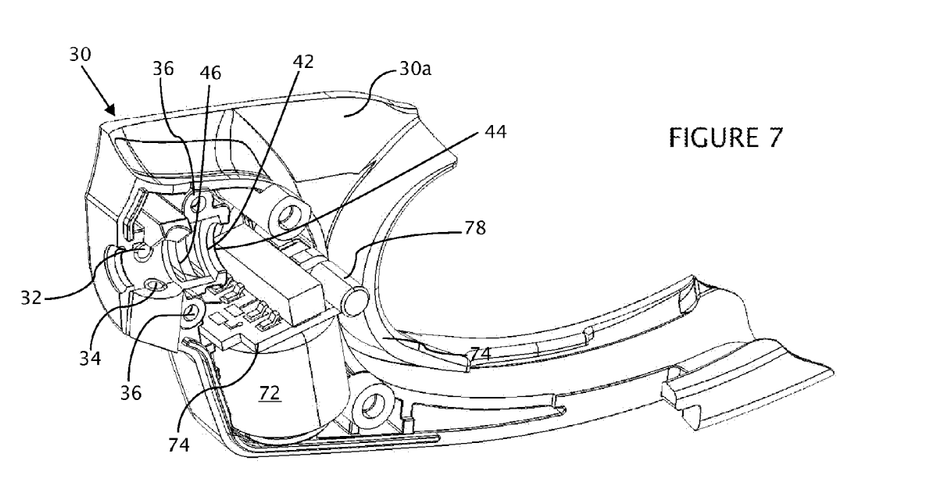
FIG. 7 is a perspective view of the alignment assembly of FIG. 2, having the laser cover, the coupling and the laser module removed.
Figure 8:
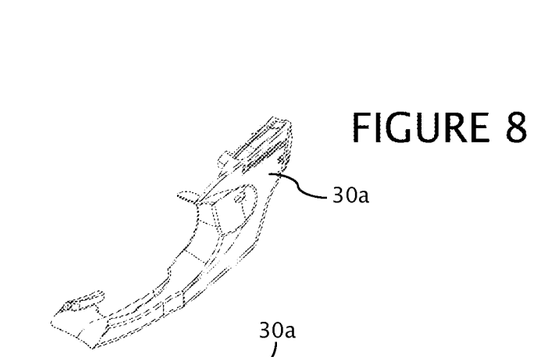
FIG. 8 is a perspective view of a right half of the housing.
Figures 9, 11:
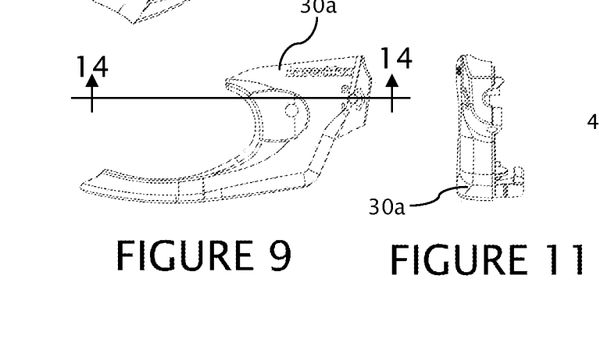
FIG. 9 is a right side elevation view of the right housing half of FIG. 8.
FIG. 11 is a front elevation view of the right housing half of FIG. 8.

The housing 30 includes at least one and in some configurations, two alignment pins 32, 34. The alignment pins 32, 34 are moveable relative to the housing 30 to contact the laser module 60. As seen in FIGS. 1, 3, and 7, the alignment pins 32, 34 can be perpendicular to each other, wherein one pin provides for movement of the laser module 60 for elevation control and movement of the remaining pin provides for windage control.

In one configuration, the alignment pins 32, 34 are threadingly engaged with the housing in corresponding through holes 33, 35. The through holes 33, 35 are sized so that the alignment pins cut at least a portion of corresponding threads in the housing 30. Thus, upon initial engagement of the alignment pins 32, 34 with the corresponding through holes 33, 35 the alignment pins cut the threads in the housing 30. It is understood a portion of each through hole 33, 35 may be formed with threads and a remaining of the through holes is formed without threads, such that the threads are formed in the remaining portion by initial engagement of the alignment pins 32, 34.

Figures 10, 12, 13:
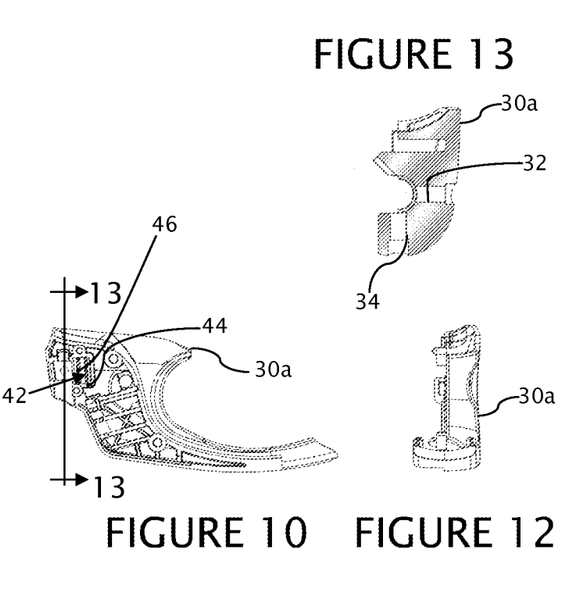
FIG. 10 is a left side elevation view of the right housing half of FIG. 8.
FIG. 12 is a rear elevation view of the right housing half of FIG. 8.
FIG. 13 is a cross sectional view taken along lines 13-13 of the right housing half of FIG. 10.
Figure 14:
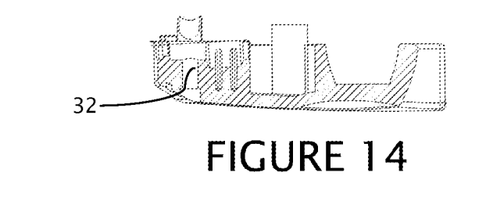
FIG. 14 is a cross sectional view taken along lines 14-14 of the right housing half of FIG. 9.
Figures 15, 17, 18:
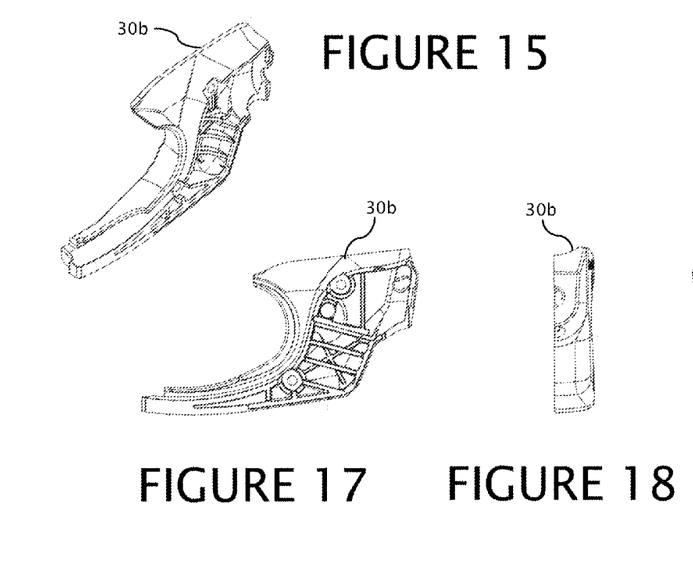
FIG. 15 is a perspective view of a left half of the housing.
FIG. 17 is a left side elevation view of the left housing half of FIG. 15.
FIG. 18 is a front elevation view of the left housing half of FIG. 15.
Figure 16:
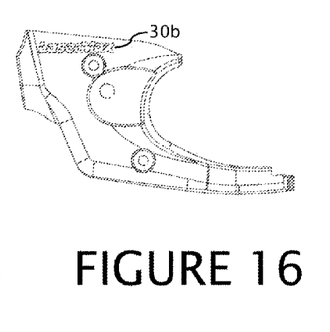
FIG. 16 is a right side elevation view of the left housing half of FIG. 15.
Figures 19, 20:
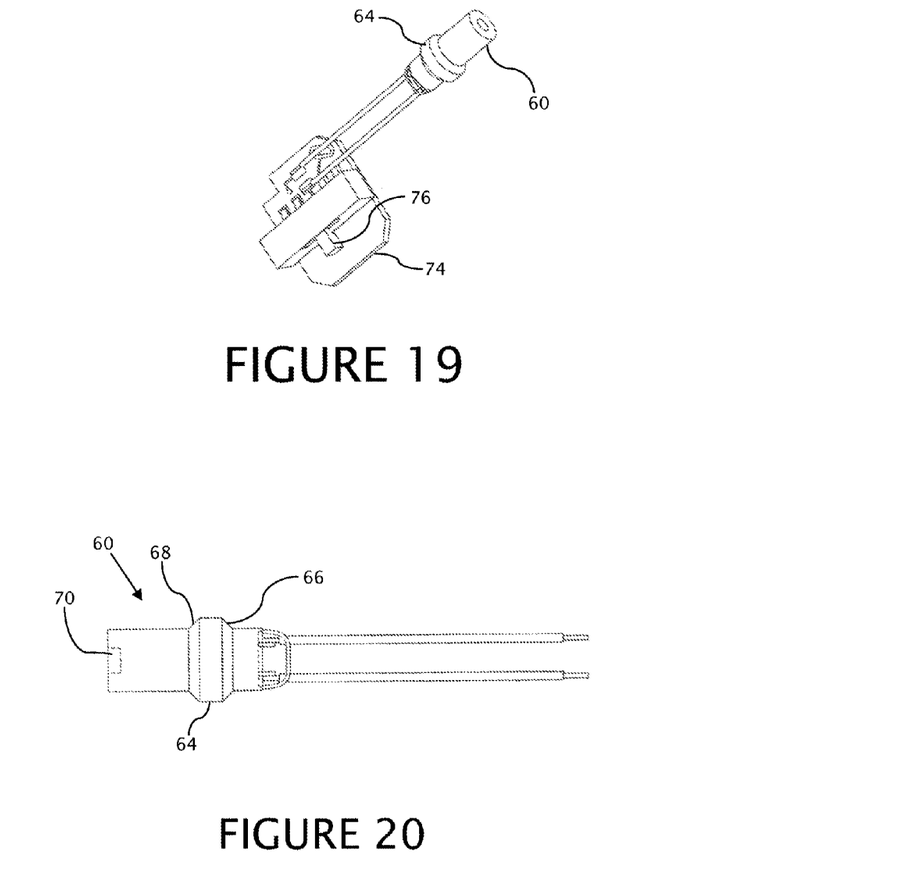
FIG. 19 is a perspective view of the laser module with connected circuit board.
FIG. 20 is a plan view of the laser module.

As seen in FIGS. 7 and 10, the housing 30 includes a socket 42 sized to cooperatively engage a portion of the coupling 90 in an interference fit. In one configuration, the socket 42 is formed in one of the halves of the housing 30. However, it is understood the socket 42 can be formed by any of a variety of constructions which provide the interference fit with the coupling 90. The socket 42 includes at least one, and can have two generally planar mating surfaces 44, 46 that incline with respect to corresponding surfaces of the coupling 90. In one configuration, the socket 42 of the housing 30 has the first mating surface 44 inclined toward the muzzle 13 and the second mating surface 46 inclined away from the muzzle.

The laser module 60 includes a laser for selectively emitting a beam of radiation, such as coherent radiation, along an optical axis. In one configuration, the laser module 60 includes an outer seat 64 in the form of an annular ridge. The outer seat 64 includes a pair of contact faces 66, 68, wherein the faces are non-parallel. As set forth in connection with the description of the coupling 90, it is understood the outer seat 64 can be arranged as a groove or recess, at least partially defined by the pair of contact faces 66, 68. As with the socket 42 in the housing 30, the contact faces 66, 68 of the outer seat 64 of the laser module 60 can be oppositely inclined with respect to the longitudinal dimension.

Depending on the construction of the laser module 60 and the housing 30, at least one of the laser module 60 and the housing 30 can include a lens or window 70 through which the laser module can project, wherein the lens can function to provide a contained environment for the laser module as well as provide optical manipulation of the passing beam, such as focusing or polarization.

It is understood that the laser module 60 is a commercially available assembly and is operably connected to a power supply 72 and a control board 74 shown in FIGS. 4-7 and 19. A satisfactory laser 60 module includes a red laser at 650 nm with an output power of 3.5 to 4.8 mW when powered by 3 volt lithium battery. It is understood the laser in the laser module 60 can be any of a variety of lasers such as, but not limited to infrared lasers, lasers emitting at 532 nm; 635 nm or 850 nm. The power supply 72 can be any of a variety of commercially available batteries, either rechargeable or disposable.

In one configuration, the control board 74 is also commercially available and sold in conjunction with the laser module 60. The control board 74 is connected to the power supply 72 and includes a switch 76 for selectively operating or supplying the laser module 60 with power. The switch 76 can include or be connected to an arm 78 that is accessible outside of the housing 3. Thus, for the housing 30 engaging a portion of the trigger guard 16 of the firearm 10, the switch 76 is located longitudinally intermediate the muzzle 13 and the trigger guard and below the barrel 12 of the firearm 10. Further, the switch 76 is disposed outside of the periphery of the trigger guard 16 and forward of the trigger guard.

In addition, the switch 76 can be configured such that the switch is moveable from a center, off, position to a left or a right on position. Therefore, in the center off position a portion of the switch 76 is accessible to each of the left and right sides of the housing 30—by virtue of the construction of the housing, such as by associated depressions or recesses 31 as seen FIGS. 1-3 and the sizing of the arm 78. The switch 76 can therefore be actuated by the user through contact from either side of the housing 30, thus providing non-handed actuation. That is, an outside surface of the housing 30 can include recesses, depressions or dimples 31 adjacent to the switch 76 so that the switch is moveable relative to the housing while at least initially being with the width of the housing.

Further, the arm 78 can be sized so that the dimension of the switch transverse to the barrel 12 is no greater than the width of the firearm 10 or frame 14. Thus, if the firearm 10 is holstered such that the sides of the firearm contact a holster, the arm 78 being dimensioned to be within the width of the firearm 10 or frame 14 does not contact the holster and thus minimizes unintended operation of the sight 22. For example, for use with the Ruger LCP having a frame width of approximately 0.82 inches, the arm 78 would have a dimension along the transverse direction of approximately 0.74 inches, or less. Therefore, in the off (centered) position of the arm 78, the arm lies within the width of the frame 14 or the firearm 10.

Figures 21, 23:
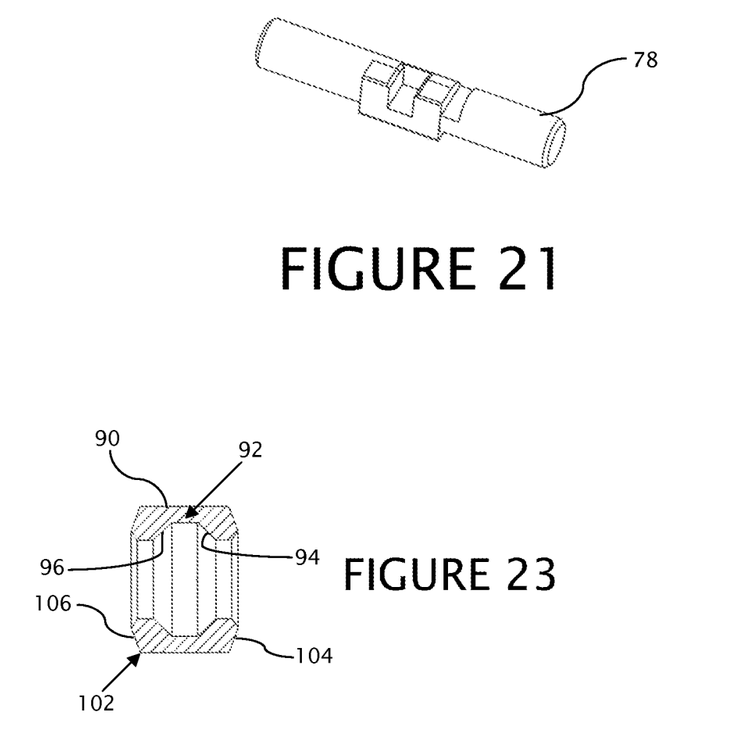
FIG. 21 is a perspective view of a portion of the switch.
FIG. 23 is a cross section view taken along line 23-23 of the coupling of FIG. 22.

The coupling 90 cooperative engages the laser module 60 to form a laser module/coupling subassembly. As seen in FIG. 23, the coupling 90 includes an internal seat 92 for engaging the laser module 60 and an external seat 102 for engaging the housing 30 and the laser cover 120.

The internal seat 92 can include facets 94, 96 for contacting the contact faces 66, 68 of the outer seat 64 of the laser module 60 such that an interference fit is formed between the coupling 90 and the laser module.

The term interference fit means a fit between mating assembled surfaces (parts) that provides an interference and a deviation from nominal dimensions in at least one of the mating surfaces. The interference fit is sufficient to preclude relative longitudinal or axial movement between the coupling 90 and the laser module 60 (or the coupling and the housing 30 or laser cover 120). In one configuration, the interference fit incorporates the contact of two non-parallel generally planar surfaces, such as along a line of contact.

Figure 22:
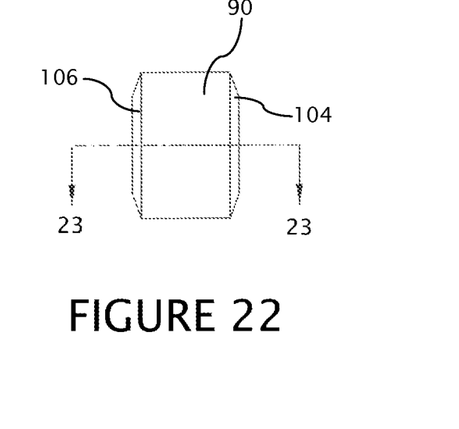
FIG. 22 is a side elevation view of the coupling.
Figure 24:
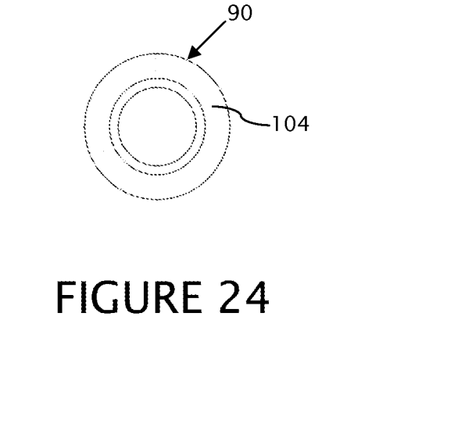
FIG. 24 is a front elevation view of the coupling of FIG. 22.
Figure 25:
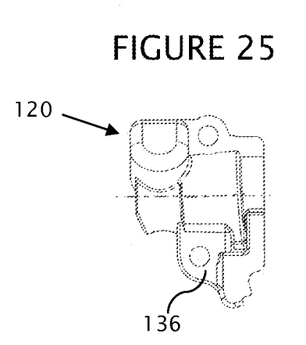
FIG. 25 is a left side elevation view of the laser cover.

Referring to FIGS. 22-24, the external seat 102 of the coupling 90 includes at least one facet 104 for forming an interference fit with at least one of the housing 30 and the laser cover 120. In one configuration, the external seat 102 includes a pair of facets 104, 106 for engaging the housing 30 and laser cover 120.

In one configuration, the engagement of the coupling 90 and the laser module 60 is free of adhesive. That is, the interface between the components is without an outside substance that causes the parts to be held closely or firmly.

The coupling 90 can be referred to as a grommet, ring or collar extending about the laser module 60. In certain of these configurations, the coupling 90 has a substantially uniform cross section. However, it is contemplated the coupling 90 can include a non uniform cross section, wherein selected portions of the coupling are sized to contact the laser module 60, the laser cover 120 and the housing 30.

For example, the coupling 90 can be formed to define inwardly projecting tabs or teeth, wherein the outer seat 64 of the laser module 60 includes corresponding recesses to capture the tabs, thereby retaining the coupling relative to the laser module in the desired degree of retention.

A satisfactory material of the coupling 90 provides for a resilient but deformable shape. An available material for the coupling 90 is Santoprene®, a thermoplastic vulcanizate (TPV) sold by Exxon Mobile. The TPV is believed to be a mixture of in-situ cross linking of EPDM rubber and polypropylene. Santoprene® 101-64 with a 69 durometer has been found satisfactory for the coupling 90.

The laser cover 120 contacts the coupling 90 as the coupling is engaged with the laser module 60 to retain the laser module relative to the housing 30. Although the laser cover 120 is shown as a separate component than the housing halves 30, it is understood the structure and function of the laser cover can be accomplished by a structured housing half or other component for engaging the housing.

Figure 26:
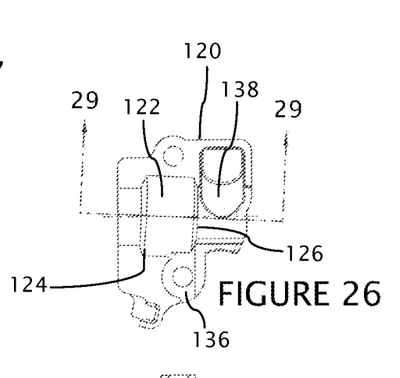
FIG. 26 is a right side elevation view of the laser cover of FIG. 25.
Figure 27:
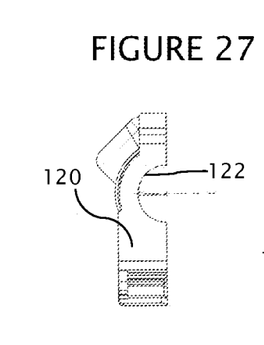
FIG. 27 is a rear elevation view of the laser cover of FIG. 25.
Figure 28:
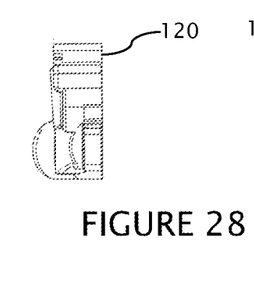
FIG. 28 is a bottom plan view of the laser cover of FIG. 25.
Figure 30:
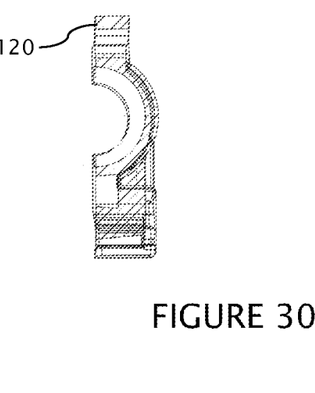
FIG. 30 is a cross section view taken along line 30-30 of FIG. 29.

As seen in FIGS. 26, 27, and 29, the laser cover 120 includes a socket 122 sized to cooperatively engage a portion of the coupling 90 in an interference fit. In one configuration, the socket 122 is formed in laser cover 120 to engage the external seat 102 of the coupling 90 in an interference fit. The socket 122 includes at least one, and in selected configurations two inclined surfaces 124, 126 for contacting the facets 104, 106 of the coupling 90 in the interference fit, as shown in FIGS. 3B and 3C.

The laser cover 120 further includes a capture recess 138 for retaining a bias member 140, such as a coil spring, to contact the laser module 60.

In one configuration, the engagement of the coupling 90 and the laser cover 120 is free of adhesive.

The laser cover 120 and the housing 30 include corresponding apertures and the housing includes threaded (or threadable) recesses for cooperatively engaging the laser cover and the housing. Although threaded connection is shown in the Figures, it is understood any available mechanical fastening could be employed, such as snap fit, press fit or friction fit.

Further, in one configuration the connection of the laser cover 120 to the housing 30 is defined by contacting stop surfaces on the housing and the laser cover 36, 136, respectively. That is, the laser cover 120 and the housing 30 are engaged, such as threaded together, to retain the laser module/coupling subassembly until the stop surfaces contact 36, 136. Thus, any deviation from nominal in the laser module/coupling subassembly does not vary the engagement of the laser cover 120 and the housing 30.

The sockets 42, 122 of the housing 30 and the laser cover 120 are configured, such that upon engagement of the laser cover and the housing to retain the laser module/coupling subassembly, the laser module 60 is disposed in a predetermined nonaligned orientation. That is, the laser module 60 is initially aligned in a predetermined orientation that is not an intended operating orientation. For example, if the laser module were operated upon initial engagement between the housing 30 and the laser cover 120, the projected beam would always be in the same quadrant relative to the longitudinal axis.

Figure 2:
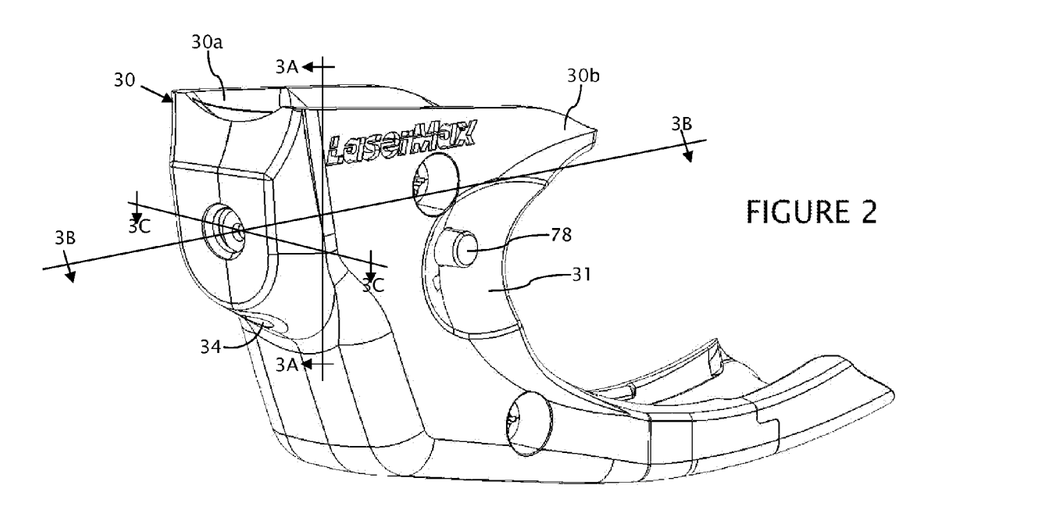
FIG. 2 is a perspective view of the laser sight having the alignment assembly.

Referring to FIGS. 2, 3A and 3C, the remaining half 30b of the housing 30 is then connected to encapsulate the laser module 60, the coupling 90 and the laser cover 120.

In construction the alignment assembly 20, the coupling 90 is connected to the laser module 60 by virtue of the interference fit between the outer seat 64 of the laser module 60 and the internal seat 92 of the coupling 90. The connection of the coupling 90 and the laser module 60 is operably achieved without requiring or employing any adhesives.

The coupling 90 is then located within the socket 42 of the housing 30, and the laser cover 120 is engaged with the housing to dispose the coupling within the socket 122 of the laser cover 120. The laser module 60 is thus disposed in the predetermined non aligned orientation with respect to a nominal aligned position.

The laser module 60 can then be readily brought to a nominal alignment position by moving the alignment pins 32, 34 in a known direction (as the non alignment position is known). Further, as the non aligned position is known, the amount of movement of the respective alignment pin 32, 34 is generally known, and thus adjustment to the nominal alignment is readily accomplished. It is understood that there may be a de minimis amount of translation of the laser module 60 along the longitudinal or axial direction relative to the coupling 90, the housing 30 or the laser cover 120 during angular movement of the laser module. However, any such translation is merely a residual effect of the angular movement (rotation) of the laser module about at least one of longitudinal or axial directions. Thus, in one configuration, the laser module 60 pivots about a point that is within the dimension of the coupling 90 as the coupling extends along the longitudinal direction. In a further configuration, the laser module 60 pivots about a point that is within the volume defined by the coupling 90 (the volume including a volume of a through hole in the coupling for receiving the laser module.

The resiliency of the coupling 90 allows the laser module 60 to be moved angularly with respect to the housing 30 and laser cover 120, without requiring longitudinal or axial movement. Further, as the interference fits are without adhesives and the engagement of the laser cover and housing is set by the stop surfaces, the movement of the laser module 60 by the alignment pins 32, 34 is limited to angular movement and does not result in misaligning axial or longitudinal movement.

The housing 30 is then engaged with the firearm 10, and depending on the desired sighting in of the user, the laser module 60 can be further aligned by the alignment pins 32, 34.

The bias of the spring 140 and the coupling 90 along with the alignment pins 32, 34 act on the laser module 60 and tend to retain the laser module in a given position. Thus, once the alignment pins 32, 34 are threaded to the desired alignment of the laser module 60, the pins remain operably fixed relative to the housing 30 until acted upon by a driver, such as an Allen wrench or a screw driver.

Thus, the alignment pins 32, 34 can change the angular position the laser module 60 relative to the housing 30 and hence firearm 10 to provide the desired alignment position, such as the laser beam coinciding with a point of impact of a projectile fired from the firearm at a desired or predetermined distance.

Although the description has set forth the laser cover 120 as a separate component from the remaining housing half 30b, it is understood the structure and functionality of the laser cover can be incorporated into the housing 30, such as in the second housing half. Thus, the second housing half could engage the first housing half and form the recited interference fits and position the laser module 60 in the predetermined non aligned position.

For purposes of the present disclosure and appended claims, the phrase "connected to" shall denote a connection between two objects either directly or through some intermediate object or member.

For purposes of the present disclosure and appended claims, the conjunction "or" is to be construed inclusively (e.g., "a bear or a pig" would be interpreted as "a bear, or a pig, or both"; e.g., "a bear, a pig, or a mouse" would be interpreted as "a bear, or a pig, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives.

For purposes of the present disclosure or appended claims, the words "comprise", comprising", "have", "having", "include", "including", and so on shall be construed as being open-ended, e.g., "including" shall be construed as "including but not limited to".

The present system has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A laser sight assembly for a firearm, the laser sight assembly comprising:
   (a) a housing engaging a portion of the firearm;
   (b) a laser module for emitting a beam along an optical axis, the laser module having an outer seat;
   (c) a resilient grommet mechanically engaging the outer seat in a first adhesive free interference fit, the grommet including an external seat; and
   (d) a laser cover engaging the housing to retain the grommet with respect to the housing and the laser cover, wherein each of the laser cover and the housing form a second adhesive free interference fit with the external seat of the grommet, and the first interference fit substantially precludes axial and longitudinal movement between the grommet and the laser module and the second interference fit substantially precludes axial and longitudinal movement between the grommet and at least one the housing and the laser cover.

2. The laser sight assembly of claim 1, wherein the laser cover and the housing dispose the laser module in a predetermined non aligned orientation relative to the firearm.

3. The laser sight assembly of claim 1, wherein the housing includes a first bore having a first longitudinal axis intersecting the laser module, the first bore having a first non-threaded portion and a first threaded alignment pin in the first bore.

4. The laser sight assembly of claim 1, wherein the housing includes a second bore having a second longitudinal axis intersecting the laser module, the second bore having a second non-threaded portion and a second threaded alignment pin in the second bore.

5. The laser sight assembly of claim 1, further comprising a bias member urging the laser module to a non-aligned orientation.

6. The laser sight assembly of claim 5, wherein the bias member is a spring pushing the laser module to a non-aligned orientation.

7. The laser sight assembly of claim 1, wherein the outer seat has at least two contact faces to form corresponding interference fits with corresponding facets on an internal seat of the grommet.

8. The laser sight assembly of claim 1, wherein the housing engages a frame of the firearm.

9. The laser sight assembly of claim 1, wherein the housing engages an exterior surface of the firearm.

10. The laser sight assembly of claim 1, wherein the housing is disposed external to the firearm.

11. The laser sight assembly of claim 1, wherein the housing includes a socket exposing a longitudinal portion of the laser module, the socket enabling insertion of the laser module into the housing.

12. The laser sight assembly of claim 11, wherein the socket is configured to retain the laser module within the housing while the laser cover is removed from the housing.

13. The laser sight assembly of claim 1, wherein the housing includes a socket forming the second adhesive free interference fit with the grommet, the socket having a longitudinal open portion configured to accept the laser module, and the laser cover being configured to extend over the longitudinal open portion of the socket to secure the laser module within the socket.

14. The laser sight assembly of claim 1, wherein the housing is configured to retain the grommet while the laser cover has been removed from the housing.

15. The laser sight assembly of claim 1, wherein the housing is configured to retain the laser module while the laser cover has been removed from the housing.

16. A laser sight assembly comprising:
   (a) a laser module for emitting a beam along an optical axis;
   (b) a housing retaining the laser module;
   (c) a resilient coupling engaging a portion of the laser module in an adhesive free first interference fit to retain laser with respect to coupling; and
   (d) a laser cover engaging the housing to retain the resilient coupling with respect to the housing and the laser cover, wherein a second adhesive free interference fit is formed between the resilient coupling and at least one of the laser cover and the housing.

17. The laser sight assembly of claim 16 wherein the coupling is a grommet.

18. The laser sight assembly of claim 16, wherein the coupling includes an external seat and the laser cover includes a socket sized to form a portion of the second interference fit with the coupling.

19. The laser sight assembly of claim 16, wherein the housing includes a first bore having a first longitudinal axis intersecting the laser module, the first bore having a non-threaded portion and a threaded alignment pin in the bore.

20. The laser sight assembly of claim 16, further comprising a bias member urging the laser module to a non-aligned orientation.

21. The laser sight assembly of claim 16, wherein the second adhesive free interference fit is formed between the resilient coupling and the housing.

22. A method of forming a laser sight assembly for a firearm, the method comprising:
   (a) disposing a resilient coupling about a laser module to form a first adhesive free interference fit between the coupling and the laser module; and
   (b) engaging a laser cover with a housing to locate a portion of the laser module and the resilient coupling intermediate the laser cover and the housing and form a second adhesive free interference fit between the resilient coupling and at least one of the laser cover and the housing.

23. The method of claim 22, wherein engaging the laser cover with the housing disposes the laser module in a non aligned orientation with respect to a nominal alignment position.

24. The method of claim 23, wherein the non aligned orientation is predetermined.

25. The method of claim 22, wherein the first interference fit and the second interference fit operably preclude longitudinal and axial movement of the laser module relative to the resilient coupler and housing.

26. The method of claim 22, further contacting the laser module with a spring to urge the laser module to a non aligned orientation with respect to a nominal alignment position.

27. The method of claim 22, wherein the coupling permits angular movement of the laser module relative to the housing to a desired alignment position.

28. The method of claim 22, wherein the coupling permits angular movement of the laser module relative to the housing to a desired alignment position while substantially precluding translation along a longitudinal or axial direction.

29. The method of claim 22, further including forming the second adhesive free interference fit between the resilient coupling and the housing.

* * * * *